(12) United States Patent
Dhanabalan

(10) Patent No.: US 11,575,949 B2
(45) Date of Patent: Feb. 7, 2023

(54) PROVIDING FILES OF VARIABLE SIZES BASED ON DEVICE AND NETWORK CONDITIONS

(71) Applicant: Citrix Systems, Inc., Fort Lauderdale, FL (US)

(72) Inventor: Praveen Raja Dhanabalan, Bangalore (IN)

(*) Notice: Subject to any disclaimer, the term of this patent is extended or adjusted under 35 U.S.C. 154(b) by 0 days.

(21) Appl. No.: 17/148,105

(22) Filed: Jan. 13, 2021

(65) Prior Publication Data

US 2021/0136428 A1 May 6, 2021

Related U.S. Application Data

(63) Continuation of application No. 16/171,652, filed on Oct. 26, 2018, now Pat. No. 10,911,798.

(51) Int. Cl.

| | |
|---|---|
| *H04N 21/2343* | (2011.01) |
| *H04L 43/0882* | (2022.01) |
| *H04L 47/27* | (2022.01) |
| *H04L 47/36* | (2022.01) |
| *H04L 67/06* | (2022.01) |
| *H04L 65/75* | (2022.01) |

(52) U.S. Cl.
CPC . *H04N 21/234363* (2013.01); *H04L 43/0882* (2013.01); *H04L 47/27* (2013.01); *H04L 47/365* (2013.01); *H04L 65/762* (2022.05); *H04L 67/06* (2013.01)

(58) Field of Classification Search
CPC ........ H04N 21/234363; H04L 43/0882; H04L 47/27; H04L 47/365; H04L 65/602; H04L 67/06; H04L 43/0894; H04L 67/303; H04L 67/2823; H04L 67/2828
See application file for complete search history.

(56) References Cited

U.S. PATENT DOCUMENTS

| | | | |
|---|---|---|---|
| 2003/0174700 A1* | 9/2003 | Ofek | H04L 69/161 370/389 |
| 2006/0120312 A1* | 6/2006 | Yamauchi | H04W 28/20 370/310 |
| 2007/0053428 A1 | 3/2007 | Saleem et al. | |
| 2010/0195521 A1* | 8/2010 | Wanstedt | H04L 47/29 370/252 |

(Continued)

FOREIGN PATENT DOCUMENTS

| | | |
|---|---|---|
| CN | 105099602 A | 11/2015 |
| WO | 2007022327 A2 | 2/2007 |

OTHER PUBLICATIONS

Jan. 29, 2022—(CN) First Office Action—App 201980079566.9.

*Primary Examiner* — Tracy Y. Li

(57) ABSTRACT

Methods and systems for providing files of variable sizes based on device and/or network conditions are described herein. A computer device may convert a file into a first modified file that includes content of the file and a second modified file that includes the content of the file. The first modified file may have a first file size and be associated with a first bandwidth range. The second modified file may have a second file size different from the first file size and be associated with a second bandwidth range different from the first bandwidth range. Based on a bandwidth available to a user device, the first modified file or the second modified file may be provided for download by the user device.

20 Claims, 7 Drawing Sheets

(56) References Cited

U.S. PATENT DOCUMENTS

2012/0265847 A1* 10/2012 Swenson .............. H04N 19/156
709/217
2012/0265901 A1 10/2012 Swenson et al.
2014/0029615 A1* 1/2014 Baldwin ............. H04L 67/2828
370/392

* cited by examiner

PROVIDING FILES OF VARIABLE SIZES BASED ON DEVICE AND NETWORK CONDITIONS

CROSS-REFERENCE TO RELATED APPLICATIONS

This application is a continuation of U.S. patent application Ser. No. 16/171,652, filed Oct. 26, 2018, the contents of which are hereby incorporated by reference in its entirety for all purposes.

FIELD

Aspects described herein generally relate to computer networking and processing received files. More specifically, aspects described herein relate to monitoring device and/or network conditions and providing files of variable sizes based on the device and/or network conditions.

BACKGROUND

Users may desire to share files with other users, such as during a virtual or physical meeting, and the user may share the file via a cloud service. Other users may be able to access the shared file(s), such as to view the file, edit the file, review the file, etc. Shared files may be encrypted and stored in the cloud. Users can access shared files from different access points via different networks.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards providing files of variable sizes based on device and/or network conditions. In some examples, a computing device may determine a first bandwidth and a second bandwidth higher than the first bandwidth in which to deliver files via the computing device. Based on the first bandwidth and the second bandwidth, the computing device may determine a plurality of file classes. Each different file class may be associated with a bandwidth range between the first bandwidth and the second bandwidth. A file may be converted into a plurality of modified files, and each modified file may have a different file size and correspond to a different file class. Based on a bandwidth associated with a user device, the computing device may provide a modified file to the user device.

In some examples, determining the first bandwidth and the second bandwidth may comprise monitoring, by the computing device, download speeds associated with a plurality of user devices, and determining the first bandwidth and the second bandwidth based on the download speeds associated with the plurality of user devices. Determining the first bandwidth and the second bandwidth may further comprise determining a default first bandwidth as the first bandwidth and a default second bandwidth as the second bandwidth, such as before monitoring the download speeds associated with the plurality of user devices. One or more of the first bandwidth or the second bandwidth may be adjusted based on the monitoring.

In some examples, an indication of a number of the plurality of file classes may be received. Determining the plurality of file classes may be based on the first bandwidth, the second bandwidth, and the number of the plurality of file classes. In some examples, the method may comprise converting, for each file of a plurality of files, the file into a plurality of modified files, and each modified file may have a different file size and correspond to a different file class.

In some examples, the method may comprise providing, to a second user device and based on a bandwidth associated with the second user device, a second modified file of the plurality of modified files. Additionally or alternatively, the method may comprise providing, to a third user device and based on a bandwidth associated with the third user device, a third modified file of the plurality of modified files. The third modified file may have a file size different from that of the second modified file. A transfer time associated with providing the second modified file to the second user device may be substantially the same as a transfer time associated with providing the third modified file to the third user device.

In some examples, the computing device may generate a mapping of each file class of the plurality of file classes to a different bandwidth range. Based on a determination that a bandwidth of a second user device corresponds to a first bandwidth range, the method may comprise providing, to the second user device, a second modified file of the plurality of modified files. A file size of the second modified file may correspond to a file class mapped to the first bandwidth range. Additionally or alternatively, based on a determination that a bandwidth of a third user device corresponds to a second bandwidth range, a third modified file of the plurality of modified files may be provided to the third user device. A file size of the third modified file may correspond to a file class mapped to the second bandwidth range.

In some examples, providing the modified file to the user device may further be based on one or more of a storage capacity of the user device or display capabilities of the user device. In some examples, a file may comprise a video file, an audio file, and/or a document file. For example, the file may comprise a video file, and converting the file into a plurality of modified files may comprise converting the video file into a plurality of modified video files. Each modified video file of the plurality of modified video files may comprise one or more of a different encoding format or a different resolution. As another example, the file may comprise an audio file, and converting the file into a plurality of modified files may comprise converting the audio file into a plurality of modified audio files. Each modified audio file of the plurality of modified audio files may comprise one or more of a different encoding format or a different bitrate. In yet another example, the file may comprise a document file, and converting the file into a plurality of modified files may comprise converting the document file into a plurality of modified document files. Each modified document file of the plurality of modified document files may comprise a different image quality of one or more images in the document file.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards providing files of variable sizes based on device and/or network conditions. A computing device may receive files from user devices and may modify the received files by, for example, reducing their size. Different size files may be transferred to other devices based on various factors, such as bandwidth, available storage space, and/or display capabilities of user devices. For example, a computing device may identify a plurality of bandwidth ranges and may also determine a plurality of file classes. Each file class of the plurality of file classes may correspond to a different file size than other file classes. The computing device may map the bandwidth ranges to the file classes. The computing device may convert a received file into a plurality of different size files, and each file may correspond to a different file class. The received file and/or modified files may be stored and/or transferred to other devices based on, for example, bandwidth conditions, available storage space, and/or display capabilities of user devices.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
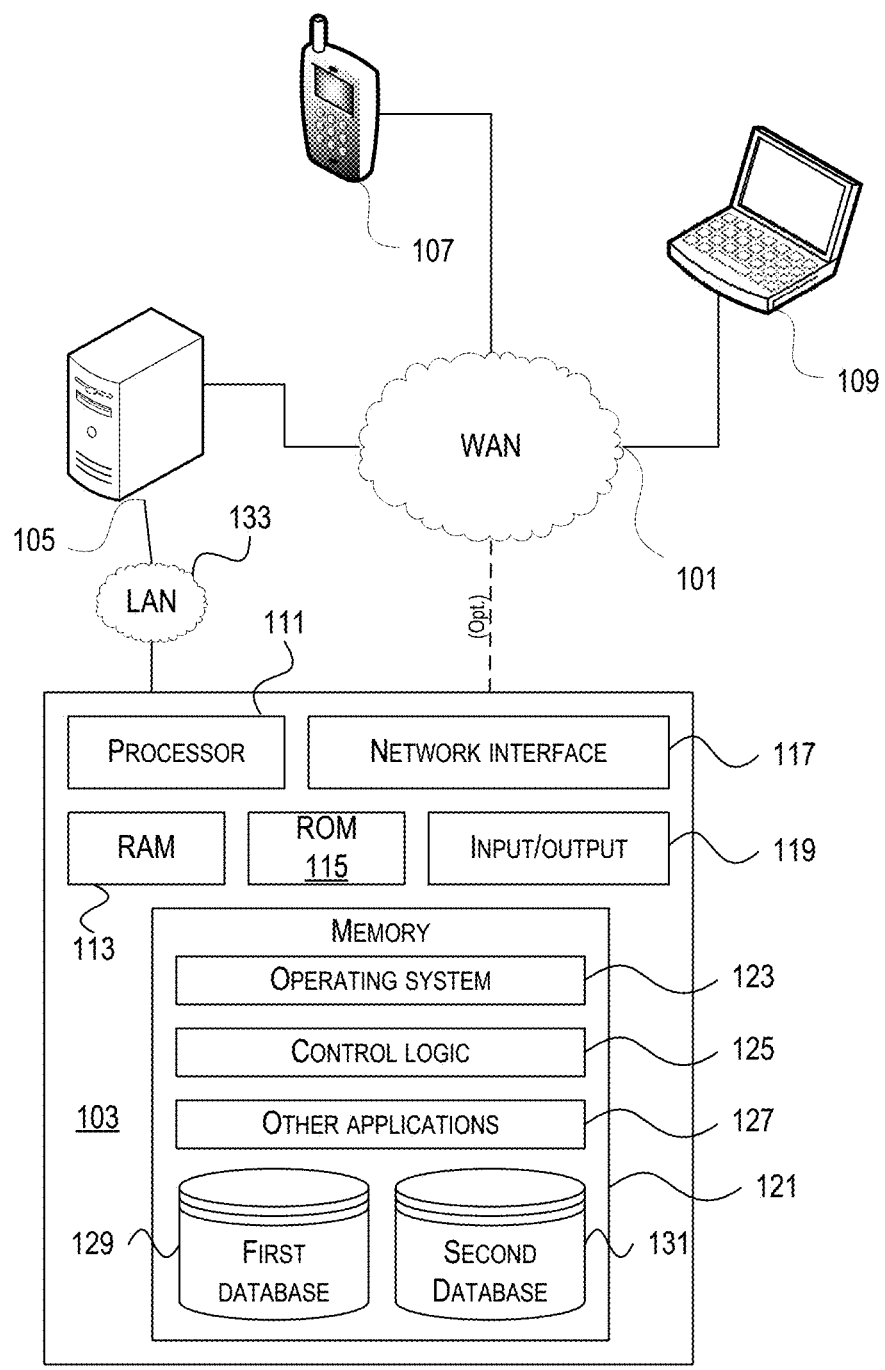
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
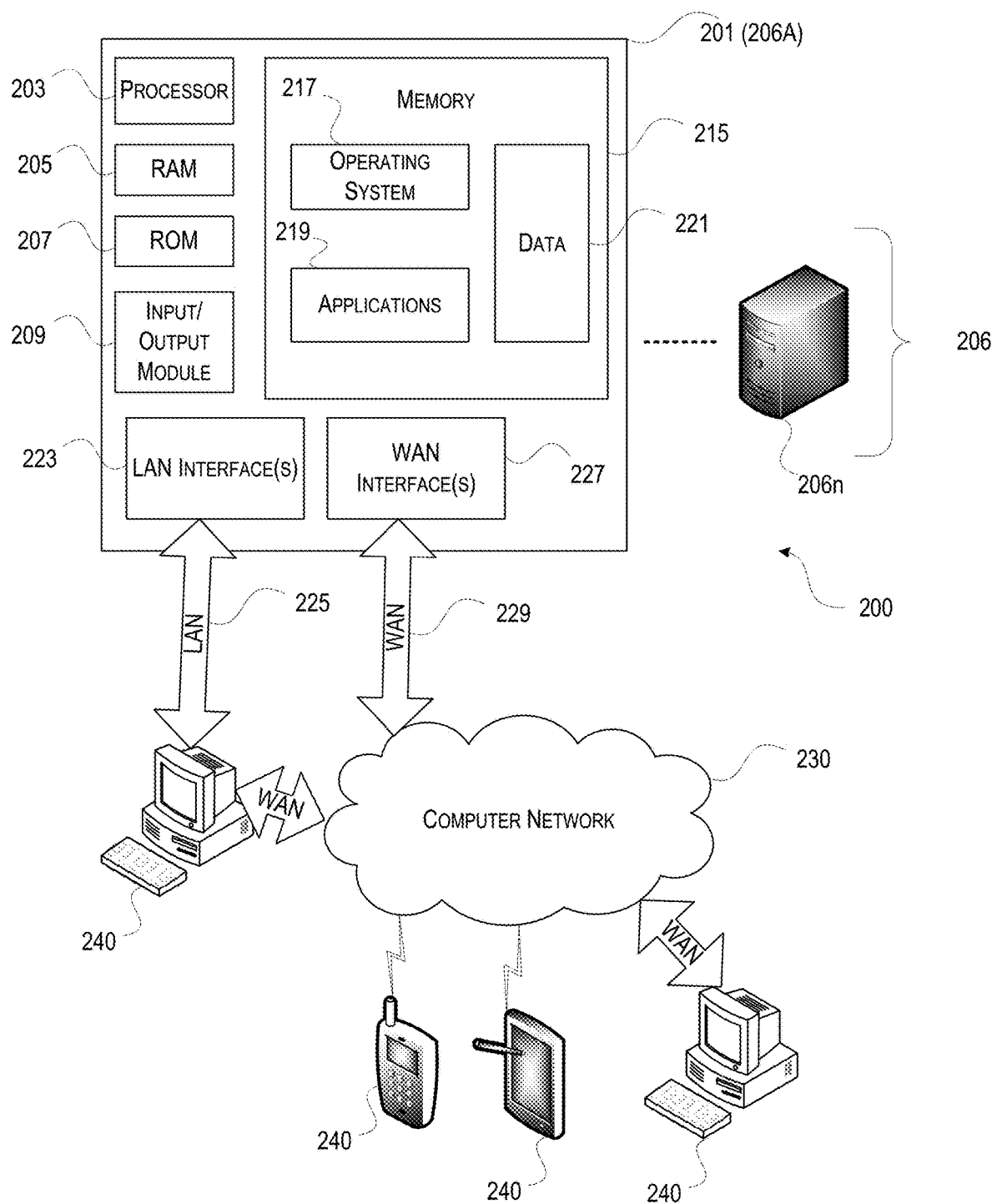
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
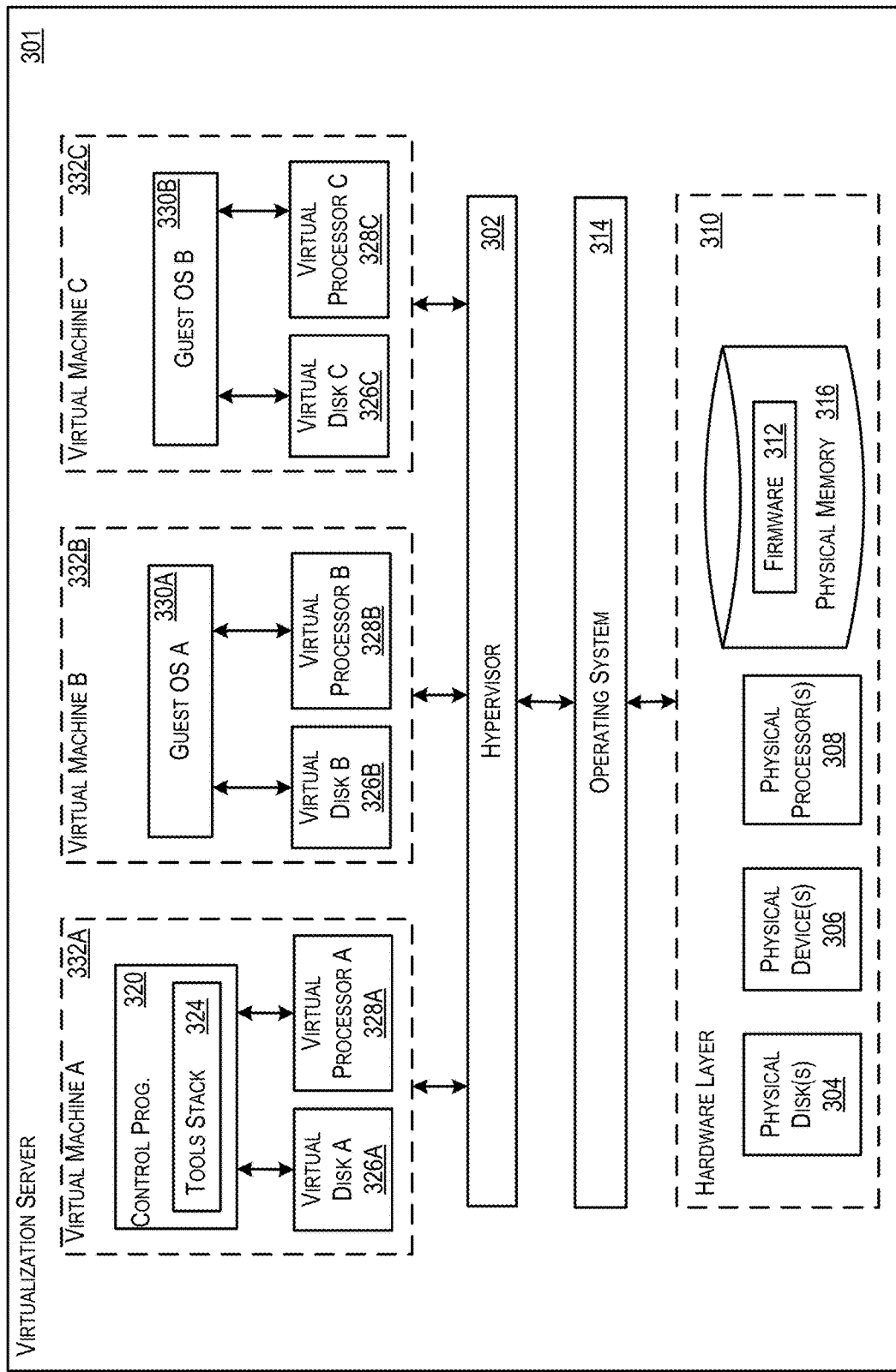
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
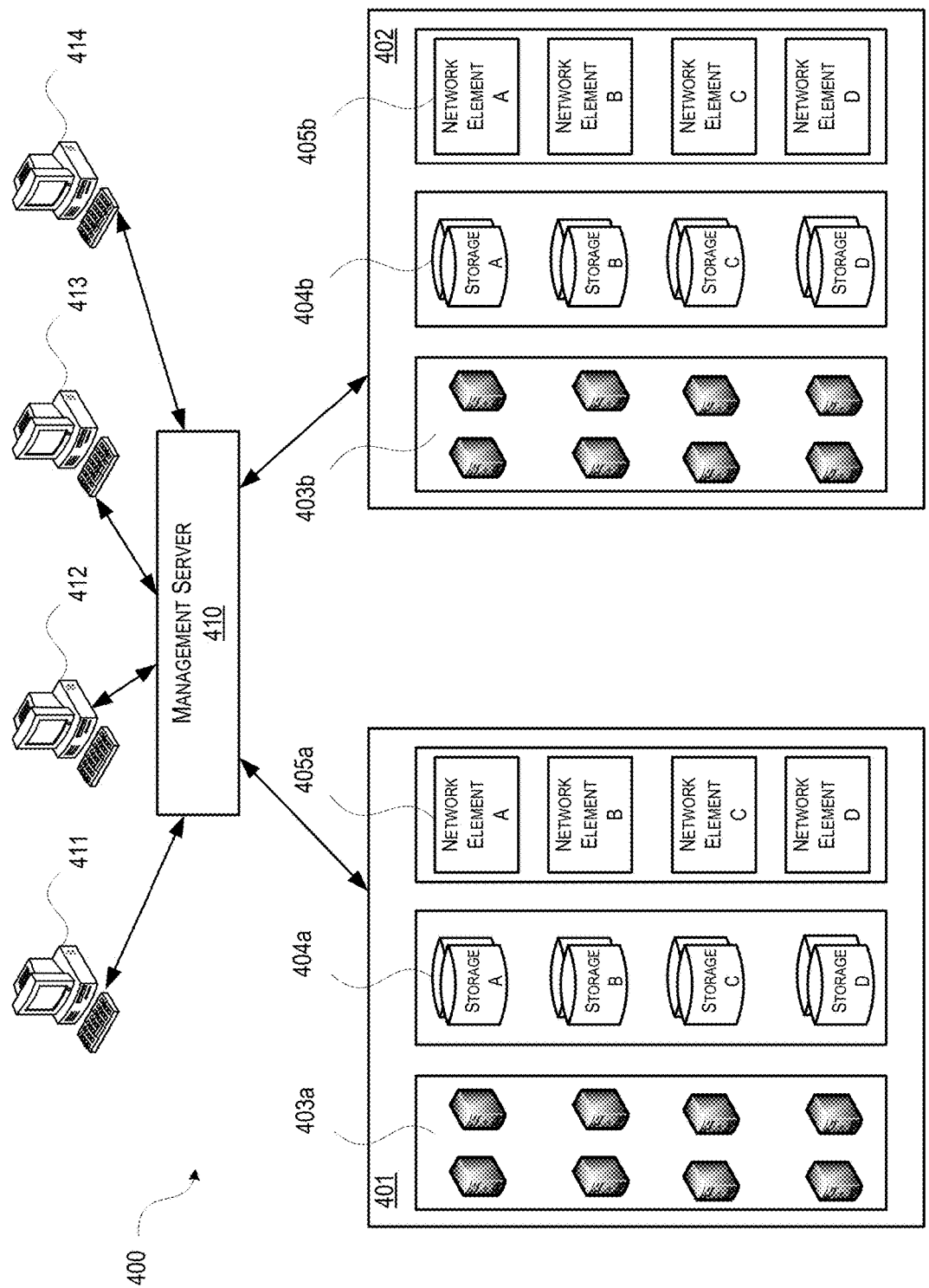
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Providing Files of Variable Sizes Based on Device and Network Conditions

Users may desire to share files with other users. However, user devices used to receive those files may have different constraints, such as bandwidth constraints, storage space constraints, or other device or network constraints. Sharing the same file with devices having different constraints may result in inefficient use of network resources, such as bandwidth resources. Aspects described herein may be used to share files of different footprints based on the user device's resources. Files of different footprints may have different file sizes. A computing device, which may comprise a server running a cloud service, may receive a file that a user desires to share with others. The user may upload the file to the computing device, and the computing device may process the file to create different versions of the file, each version having a different file size. For example, the file may be compressed or otherwise modified to reduce its size and/or quality, which may be used to save bandwidth when delivering the file to other user devices. Examples of user devices include mobile phones, tablets, desktop computers, laptop computers, and the like. Before delivering the file to a user device, bandwidth constraints, storage space usage, display quality, and/or other parameters of the user device receiving the file may be detected. An appropriate version of the file (e.g., based on the size) may be selected based on device and/or network conditions.

In some scenarios, files may be shared with multiple users in uniform or substantially uniform time and/or so that the user experience of receiving shared content is not compromised. Versions of a file with variable footprints may be created and/or shared in an effective way such that the amount of time taken to share the file with a low resource user device (e.g., a device connected to a slower network) may match or be similar to the amount of time taken to share the file with a higher resource user device (e.g., a device connected to a faster network). For example, a higher quality version of a file may be shared with a first user device with more available bandwidth, more available storage space, etc., and a lower quality version of the file may be shared with a second user device with less available bandwidth, less available storage space, etc. In some examples, the file may be shared with the first and second user devices in uniform or almost uniform time, even though the user device may have different resource constraints.

Figure 5:
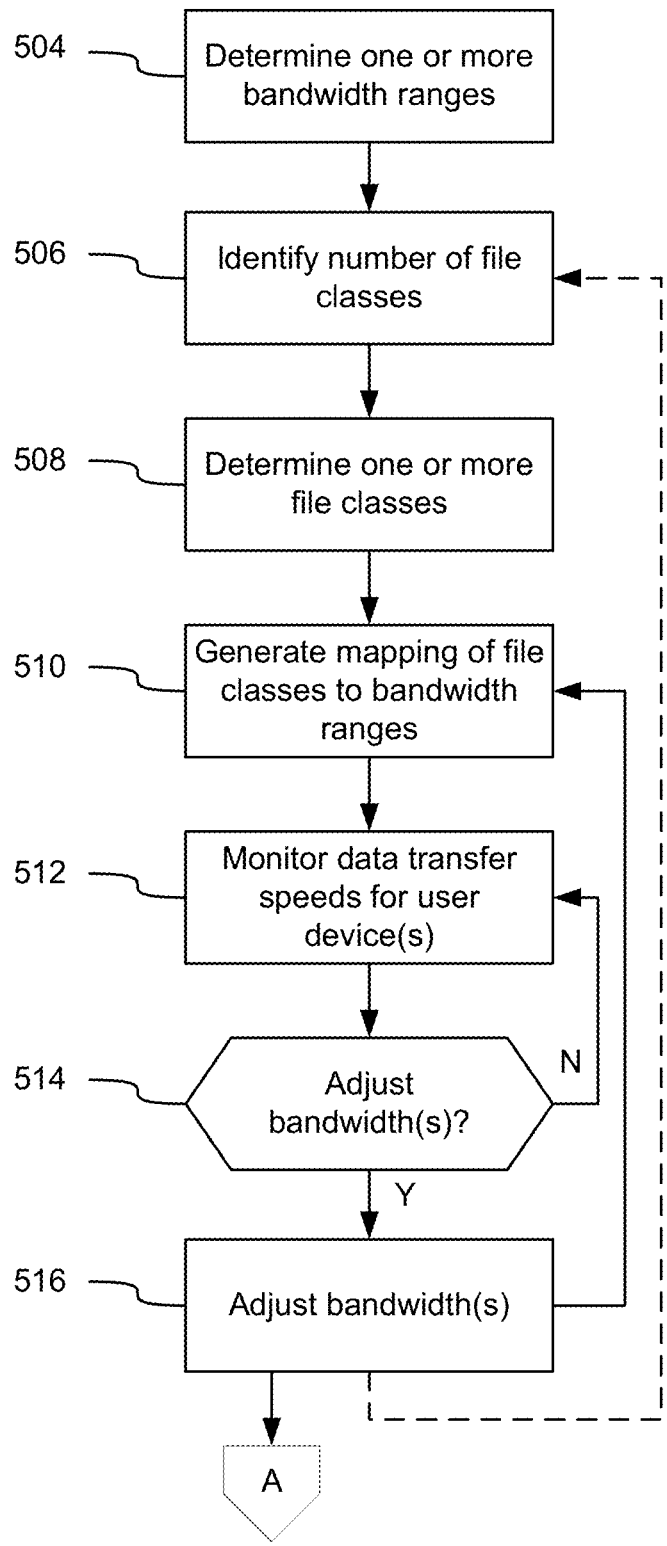
FIG. 5 illustrates an example method for determining one or more file classes based on bandwidths in accordance with one or more illustrative aspects described herein.

FIG. 5 illustrates an example method for determining one or more file classes based on bandwidths in accordance with one or more illustrative aspects described herein. In step 504, a computing device may determine one or more bandwidth ranges, which may be used to create files of variable footprints. As will be described in further detail below, each bandwidth range may correspond to a different file class and/or file size. In some examples, the bandwidth ranges may depend on two bandwidths, such as a first bandwidth (e.g., a minimum bandwidth) and a second bandwidth higher than the first (e.g., a maximum bandwidth). An administrator may configure default or initial bandwidths, such as the minimum bandwidth and the maximum bandwidth. For example, a minimum bandwidth may be set to 1 megabits per second (Mbps), and a maximum bandwidth may be set to 11 Mbps. As will be described in further detail below, the minimum bandwidth and/or maximum bandwidth may be adjusted based on bandwidth measurements made by the computing device and/or user devices. In some examples, the bandwidths may comprise download speeds or throughputs for the user devices.

The bandwidth range(s) determined in step 504 may be between the minimum and maximum bandwidths. For example, a first bandwidth range may be from 1 Mbps to 3 Mbps, a second bandwidth range may be from 3 Mbps to 5 Mbps, a third bandwidth range may be from 5 Mbps to 10 Mbps, and a fourth bandwidth range may be from 10 Mbps to 11 Mbps. Any number of bandwidth ranges between the minimum and the maximum bandwidths may be determined. In some examples, the bandwidth ranges may be of equal size (e.g., 2 Mbps per range). In other examples, one or more bandwidth ranges may have a different size than one or more other bandwidth ranges (e.g., one bandwidth range with 2 Mbps size, a second bandwidth range with 5 Mbps size, etc.). The size of each bandwidth range may depend on the number of classes of files to be generated.

In step 506, the computing device may identify a number of file classes for file(s) to be shared. As will be described in further detail below, each file class may correspond to a different size version of a file to be shared. In some examples, the computing device may receive an indication of the number of the plurality of file classes to be created, such as from an administrator or from the user desiring to share the file. For example, assume that the number of file classes is 5. The computing device may determine to generate 5 versions of the file, each version having a different footprint. In some examples, the number of file classes may be automatically determined based on feedback from one or more user devices. As will be described in further detail below, a file may be too small to be usable, and a user device may provide feedback that the file is too small. The computing device may remove one or more of the smaller files, resulting in a reduction of the number of file classes.

In step 508, the computing device may determine one or more of the file classes, which may be based on a first bandwidth (e.g., a minimum bandwidth, such as 1 Mbps) and a second bandwidth (e.g., a maximum bandwidth, such as 11 Mbps). The computing device may also determine file classes based on the number of classes determined in step 506 (e.g., 5 file classes). Each file class may correspond to a different file size than other file classes. For example, with 5 file classes, the computing device may determine 5 file classes with different sizes, such as a class A (e.g., the actual size of the file), a class B (e.g., file size*4/5), class C (e.g., file size*3/5), class D (e.g., file size*2/5), and class E (e.g., file size*1/5). While this example uses 5 file classes, more (or fewer) file classes may be used. Moreover, files may also have divisions of varying sizes. For example, if a particular class A file is 100 MB, the class B file may be 80 MB, the class C file may be 71 MB, the class D file may be 44 MB, and the class E file may be 15 MB.

In step 510, the computing device may generate a mapping that maps each file class to a different bandwidth range. As will be described in further detail below, the computing device may use the mapping to determine which file to send to a user device, and the determination may be based on the bandwidth of the user device. In the above example of five classes of traffic with a minimum bandwidth of 1 Mbps and a maximum bandwidth of 10 Mbps, the computing device may generate the following bandwidth range to class mapping:

| File Class | Bandwidth Range |
|---|---|
| Class A | 9-11 Mbps |
| Class B | 7-9 Mbps |
| Class C | 5-7 Mbps |
| Class D | 3-5 Mbps |
| Class E | 1-3 Mbps |

In some scenarios, the bandwidth ranges may be adjusted based on actual data transfer speeds of user devices. In step 512, the computing device may monitor data transfer speeds for user device(s). For example, the computing device may monitor download speeds associated with one or more user devices. A user device may measure its download speed and send the measured download speed to the computing device. The user device may do this periodically, occasionally, etc. Other user devices may similarly measure their download speeds and send the measurements to the computing device.

In step 514, the computing device may determine whether to adjust the bandwidths (e.g., minimum and/or maximum bandwidths) and/or bandwidth ranges based on measured transfer speeds. For example, if the transfer speed measured among a group of devices decreases, the computing device may reduce the maximum bandwidth, which may result in an adjustment to the bandwidth ranges. Other examples of adjusting the bandwidths and/or bandwidth ranges will be described in further detail below. If the computing device determines not to adjust the bandwidth(s) (step 514: N), the computing device may return to step 512 to continue monitoring data transfer speeds. If the computing device determines to adjust the bandwidth(s) (step 514: Y), the computing device may proceed to step 516.

In step 516, the computing device may adjust the bandwidth and/or bandwidth ranges. In some examples, the computing device may adjust the minimum bandwidth and/or the maximum bandwidth based on the measured data transfer speed(s). For example, assume that a plurality of user devices return bandwidth measurements measured at an instance in time or within a band of time. The computing device may use those measurements to adjust the minimum bandwidth and/or the maximum bandwidth used to determine the bandwidth ranges. For example, if the minimum bandwidth measurement from a group of user devices (e.g., 1.5 Mbps) is higher than the previous minimum bandwidth (e.g., 1 Mbps), the computing device may change the minimum bandwidth to 1.5 Mbps. If the maximum bandwidth measurement from the group of user devices (e.g., 10 Mbps) is lower than the previous maximum bandwidth (e.g., 11 Mbps), the computing device may change the maximum bandwidth to 10 Mbps. Thus, the computing device may adjust the bandwidth ranges based on actual data speed(s) measured by user devices. By adjusting the bandwidth ranges, the computing device may provide files of the appropriate size to user devices, such as to provide files to multiple user devices in approximately the same amount of time. Assuming that the same number of file classes are to be created (e.g., 5 classes), the computing device may generate a new bandwidth range to class mapping as follows:

| File Class | Bandwidth Range |
|---|---|
| Class A | 8.3-10 Mbps |
| Class B | 6.6-8.3 Mbps |
| Class C | 4.9-6.6 Mbps |
| Class D | 3.2-4.9 Mbps |
| Class E | 1.5-3.2 Mbps |

The computing device may similarly adjust the bandwidth ranges if the maximum bandwidth measured by a user device increases and/or if the minimum bandwidth measured by a user device decreases. In some aspects, measurements that are outliers may be ignored. Outliers may be ignored so that the bandwidth ranges are not adjusted based on data transfer speeds measured by a user device that is vastly different from data transfer speeds of other user devices. Various algorithms and techniques, such as thresholds, may be used to detect outliers. For example, if one of the user devices returns a download speed of 100 Mbps, that measurement may be ignored for purposes of calculating the maximum bandwidth. Accordingly, the minimum bandwidth, maximum bandwidth, and/or the bandwidth ranges may be tuned based on measurements from user devices. By tuning the bandwidths, files may be delivered to different user devices in approximately the same amount of time. The computing device may store the bandwidth ranges, file classes, and/or mappings, and the information may be used to determine which file(s) to send to each user device, as will be described in further detail below.

After the bandwidth(s) are adjusted in step 516, the computing device may return to step 510 to update the bandwidth range to class mapping as shown above. In some scenarios, the computing device may receive, such as from an administrator, an update to the number of file classes. For example, the number of file classes may be increased from 5 to 7. The computing device may return to step 506 (as shown by the dotted line in FIG. 5) to identify the number of file classes and update the mapping of file classes to bandwidth ranges (e.g., in step 510).

Figure 6:
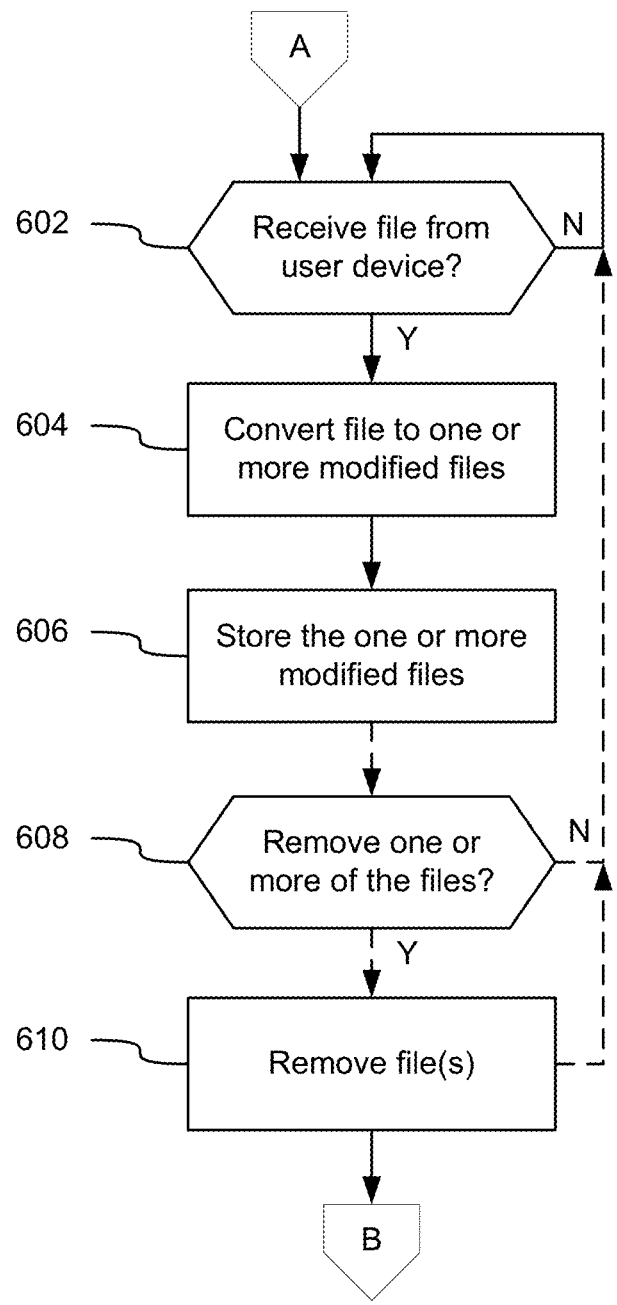
FIG. 6 illustrates an example method for converting files to modified files in accordance with one or more illustrative aspects described herein.

FIG. 6 illustrates an example method for converting files to modified files in accordance with one or more illustrative aspects described herein. In step 602, the computing device may determine whether a file has been received from the user device. If not (step 602: N), the computing device may wait to receive a file. If the computing device receives a file from a user device (step 602: Y), the computing device may proceed to step 604.

In step 604, the computing device may convert the received file to a plurality of modified files, such as multiple modified files. As previously explained, each modified file may correspond to a different file class of a plurality of file classes, and each modified file may have a different file size. Various techniques and algorithms may be used to create files of variable footprints. The technique and/or algorithms used may depend on the type of file to be converted. For example, assume that the file is a video file. The computing device may convert the video file into a plurality of modified video files, such as by using a different type or level of compression on the video file for each class. For example, the encoding format may be changed, the resolution of the video (e.g., number of pixels per dimension) may be changed, the number of frames per second may be changed, etc. Each modified video file may have one or more of a different encoding format, a different resolution, a different number of frames per second, etc. Other parameters of the video file may be changed to generate a larger or smaller video file.

Additionally or alternatively, the file to be converted may comprise an audio file. The computing device may convert the audio file into a plurality of modified audio files, such as by using a different type or level of compression of the audio file. Various parameters, such as encoding format, bitrate, etc., may be adjusted to adjust the size of the audio file. Different lossless or lossy compression techniques may be used. In some examples, the file to be converted may comprise a document file, such as a Portable Document Format (PDF) file, a Word document, etc. The computing device may convert the document file into a plurality of modified document files, and each modified document file may comprise one or more of a different resolution, a different dot density, a different image quality, etc. Documents may be reduced in size by, for example, reducing the image quality of images in the document (if any).

As a brief example, assume that the file received from the user device is 50 Megabytes (MB) in size, and the number of file classes is 5. The computing device may reduce the footprint for the file uploaded to fit in the various classes. For example, class A may comprise the original file (e.g., a 50 MB file). Class B may comprise approximately a 40 MB version of the file. Class C may comprise approximately a 30 MB version of the file. Class D may comprise approximately a 20 MB version of the file. Class E may comprise approximately a 10 MB version of the file. As previously explained, different compression techniques may be used to generate each modified file.

In step 606, the computing device may store one or more of the modified files. As will be described in further detail below, the computing device may deliver files to user devices based on various device and network conditions, such as available bandwidth. For example, users may desire to share or to receive shared files. However, users may move around and/or connect to different networks, which may affect the user device's connectivity strength. The computing device may return to step 602 to determine whether it has received another shareable file from a user device. Optionally, the computing device may proceed to step 608 to determine whether to remove any of the modified files.

In step 608, the computing device may determine whether to remove one or more of the modified files. For example, the quality of some files may be too low, and the computing device may remove these files. The size of the file and/or the quality of the file may be compared to a threshold size and/or quality to make this determination. For example, a threshold size may be 2 MB. If a modified file is 1.2 MB, the computing device may determine to remove the file because it is less than 2 MB in size. As another example, a threshold resolution for an image may be 50 dots per inch (dpi). If a modified file is (or includes) an image with a resolution of 28 dpi, the computing device may determine to remove the file. If the computing device determines to remove one or more files (step 608: Y), the computing device may remove one or more of the modified files in step 610. Otherwise the computing device may return to step 602 to determine whether it has received another shareable file from a user device.

Figure 7:
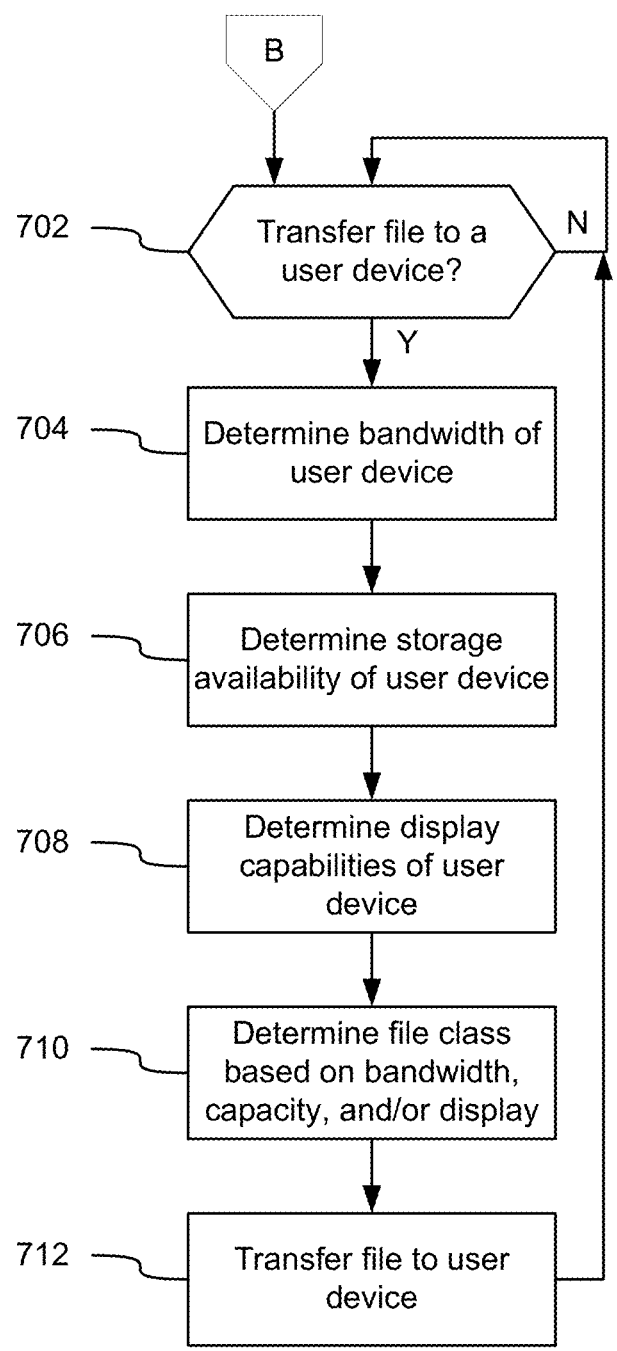
FIG. 7 illustrates an example method for transferring modified files to user devices in accordance with one or more illustrative aspects described herein.

FIG. 7 illustrates an example method for transferring modified files to user devices in accordance with one or more illustrative aspects described herein. In step 702, the computing device may determine whether to transfer a file to a user device. For example, the user device may request the file from the user device. Or the user device that uploaded the file may request to have the file transferred to one or more other user devices. If the computing device determines to transfer a file (step 702: Y), the computing device may proceed to step 704. Which file to transfer to the user device may depend on one or more factors, such as bandwidth of the user device, storage availability of the user device, display capabilities of the user device, and/or other factors.

In step 704, the computing device may determine a bandwidth of the user device. As previously explained, the user device may measure its available bandwidth, such as data download speed. For example, the user device may have an application that periodically or occasionally monitors data transfer speeds of the user device. Additionally or alternatively, the user device may measure its bandwidth just before it downloads the file. In some examples, the computing device may send, to the application, a request for the application to perform a bandwidth check. The application on the user device may respond with the bandwidth measurement. The feature of measuring transfer speeds may be turned on or off by the user of the user device and/or may be configured by an administrator. The bandwidth may be used to determine which file class to send to the user device. For example, a larger file may be sent to the user device if its bandwidth is relatively high.

Optionally, in step 706, the computing device may determine a storage availability and/or capacity of the user device. Some user devices may have storage limitations, such as a mobile device with little available storage. The computing device may perform a storage check on the user device. For example, at regular intervals and/or just before transferring the file to the user device, the computing device may request, from the user device, an indication of the storage space available on the user device. The user device may send, to the computing device, information indicative of the available storage space. For example, the information may indicate that the user device has 1 gigabyte of available storage space, 50 megabytes of available storage space, etc. The storage space available to the user device may be used to determine which file class to send to the user device. For example, a larger, higher quality file may be sent to the user device if the user device has sufficient storage space for the larger file.

Optionally, in step 708, the computing device may determine display capabilities of the user device, such as resolution, screen size, graphics card type, processor type, video decoding capabilities, etc. The application used to determine the bandwidth of the user device (or a different application) may be used to determine the display capabilities of the user device. For example, on installing or running the application, video playback capabilities of the user device may be shared with the computing device. The user device may send, to the computing device, its video playback capabilities, such as its screen size, screen resolution, graphics card model, and the like. The display capabilities of the user device may be used to determine which file class to send to the user device. For example, a mobile phone or a laptop may have a lower resolution screen than another larger device, such as a television. If the device with the lower resolution screen does not play back 4K video, for example, the computing device may send a lower resolution file rather than an original file that may be in 4K format. For example, the next lower resolution file, such as a file in 2K format, may be sent. Additionally or alternatively, the computing device may query the user device for its screen resolution, and the computing device may provide the corresponding video file (or the next higher quality video or the next lower quality video if a video in that resolution is not available).

In step 710, the computing device may determine a file class based on one or more of the bandwidth of the user device (e.g., as determined in step 704), the storage availability of the user device (e.g., as determined in step 706), and/or the display capabilities of the user device (e.g., as determined in step 708). The computing device may select a file class (e.g., classes A-E) based on the available bandwidth. The computing device may use the mapping of file classes to bandwidth ranges to determine the file class. For example, assume that the available bandwidth of the user device is 6 Mbps. In the example above with the maximum bandwidth of 11 Mbps and the minimum bandwidth of 1 Mbps, the computing device may determine to send the class C file. If the available bandwidth of another user device is 9.3 Mbps, the computing device may determine to send the class A file to the other user device. In effect, the time taken by the user device downloading the class A file may be similar to the time taken by the user device downloading the class C file because the footprint of the files and the bandwidths of the user devices are different.

In some scenarios, the computing device might not have created a file for each file class because of, for example, limitations of the encoding software used. If the corresponding file class is not available, the computing device may send the next higher or the next lower class of the same file. Assume that the class C file is not available in the above example. For example, the encoding software might not have capabilities to generate a class C file. The computing device may send the class D file or the class B file to the user device. For example, the computing device may send the class D file if the user device's bandwidth is on the lower end of the bandwidth range for class C files or may send the class B file if the user device's bandwidth is on the higher end of the bandwidth range for class C files. Similarly, if the bandwidth of the user device exceeds the maximum bandwidth, the computing device may send the highest quality file, such as the class A file. If the bandwidth of the user device falls below the minimum bandwidth, the computing device may send the lowest quality file, such as the class E file.

The quality of some files may be too low to be usable by user devices in some situations. For example, assume that the quality of the class E file is very low and/or otherwise unusable. As previously explained, the computing device may remove the low quality file. Moreover, the files to be removed may be based on user feedback that the quality of the file is too low. The computing device may deliver the next higher quality file, such as the class D version of the file.

The file class selected for the user device may additionally or alternatively be based on the storage capacity of the user device. The computing device may determine the user device's storage availability (e.g., in step 706) and select a file that can fit on one or more of the user device's storage medium(s). For example, the computing device may select the largest file and/or the highest quality file that can fit on the user device's storage medium(s). As another example, assume that the computing device would have determined to send a file of class A to the user device based on the user device's current (high) bandwidth. However, if the user device does not have enough storage space for the class A file, the computing device may determine to send a smaller size file, such as a class B file or a class C file, that can fit on the user's device.

The file class selected for the user device may additionally or alternatively be based on the display capabilities of the user device. The computing device may determine the user device's display capabilities (e.g., in step 708) and select a file class appropriate for the user device's display capabilities. In some scenarios, the computing device may select the largest file and/or the highest quality file that can be played back by the user device. For example, if the user device has a 4K display, the computing device may send a 4K file to the user device assuming that the user device has enough storage space and/or that the 4K file corresponds to the current bandwidth of the user device. As another example, assume that the computing device would have determined to send a file of class A (e.g., a 4K file) to the user device based on the user device's current bandwidth. However, if the user device does not have a 4K display, the computing device may determine to send a lower quality file, such as a class B file (e.g., a 2K file) or a class C file (e.g., a 1080p file).

After the computing device determines the class of the file to send to the user device, in step 712, the computing device may transfer, to the user device, a file of the file class. The computing device may return to step 702 to determine whether to transfer the file to other user devices and/or whether to transfer other files. Different modified files may be sent to different user devices. For example, assume that a first user device uploads a file to be shared, and the computing device generates a plurality of modified files, each with a different file size. The computing device may transfer, to a second user device and based on the bandwidth of the second user device, a first modified file of the plurality of modified files. The computing device may transfer, to a third user device and based on the bandwidth of the third user device, a second modified file of the plurality of modified files. The first and second modified files may be of different file classes and/or sizes. For example, the file size of the first modified file may correspond to a file class mapped to a first bandwidth range, and the file size of the second modified file may correspond to a file class mapped to a second bandwidth range, as previously explained. In some examples, the transfer time associated with transferring the first modified file to the second user device may be substantially the same as the transfer time associated with transferring the second modified file to the third user device.

By transmitting files of the appropriate size and/or quality, the amount of traffic going through a network may be reduced and/or the speed at which the user device receives the file may be increased. For example, a user who is travelling may face bandwidth issues but may quickly receive a file shared by another user. Users may receive lower quality or size files (e.g., video, audio, document, image, etc.), but receive them quickly. In some examples, higher quality files may be sent to the user device at a later time, such as during an idle time. For example, when the user is not using an application, a high quality version of the file (e.g., a class A file), may be downloaded by the user device and may replace the lower quality file. The option to download a higher quality file may be configured by the user of the user device despite the difference in bandwidth associated with each user device.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
converting, by a computing device, a file comprising content into a first modified file that includes the content of the file and has a first level of compression, wherein the first modified file has a first file size and is associated with a first bandwidth range, the first bandwidth range comprising a first minimum bandwidth of the first modified file and a first maximum bandwidth of the first modified file;
converting, by the computing device, the file into a second modified file that includes the content of the file and has a second level of compression different from the first level of compression, wherein the second modified file has a second file size different from the first file size and is associated with a second bandwidth range different from the first bandwidth range, the second bandwidth range comprising a second minimum bandwidth of second modified file and a second maximum bandwidth of the second modified file; and
providing, by the computing device, based on a bandwidth available to a user device and further based on the first minimum bandwidth of the first modified file, the first maximum bandwidth of the first modified file, the second minimum bandwidth of the second modified file, and the second maximum bandwidth of the second modified file, one of the first modified file or the second modified file for download by the user device.

2. The method of claim 1, further comprising:
based on determining a change in a measured data transfer speed of the user device, associating the first modified file with a third bandwidth range; and
providing, by the computing device and based on the third bandwidth range, the first modified file to the user device.

3. The method of claim 1, wherein the first modified file has a first image quality, and wherein the second modified file has a second image quality that is different from the first image quality.

4. The method of claim 1, wherein the providing one of the first modified file or the second modified file to the user device comprising at least one of:
based on the bandwidth available to the user device satisfying a threshold, providing the first modified file to the user device; or
based on the bandwidth available to the user device not satisfying the threshold, providing the second modified file to the user device.

5. The method of claim 4, wherein a transfer time associated with providing the first modified file is within a threshold time difference from a transfer time associated with providing the second modified file.

6. The method of claim 1, further comprising:
generating, by the computing device, a mapping of a plurality of file classes to a plurality of bandwidth ranges, wherein the plurality of bandwidth ranges comprise the first bandwidth range and the second bandwidth range.

7. The method of claim 1, wherein the providing one of the first modified file or the second modified file is further based on a display capability of the user device.

8. The method of claim 1, wherein the first modified file and the second modified file have at least one of a different encoding format, a different resolution, a different bitrate, or a different image quality.

9. An apparatus comprising:
one or more processors; and
memory storing instructions that, when executed by the one or more processors, cause the apparatus to:
convert a file comprising content into a first modified file that includes the content of the file and has a first level of compression, wherein the first modified file has a first file size and is associated with a first bandwidth range, the first bandwidth range comprising a first minimum bandwidth of the first modified file and a first maximum bandwidth of the first modified file;
convert the file into a second modified file that includes the content of the file and has a second level of compression different from the first level of compression, wherein the second modified file has a second file size different from the first file size and is associated with a second bandwidth range different from the first bandwidth range, the second bandwidth range comprising a second minimum bandwidth of the second modified file and a second maximum bandwidth of the second modified file; and
provide, based on a bandwidth available to a user device and further based on the first minimum bandwidth of the first modified file, the first maximum bandwidth of the first modified file, the second minimum bandwidth of the second modified file, and the second maximum bandwidth of the second modified file, one of the first modified file or the second modified file for download by the user device.

10. The apparatus of claim 9, wherein the instructions, when executed by the one or more processors, further cause the apparatus to:
based on determining a change in a measured data transfer speed of the user device, associate the first modified file with a third bandwidth range; and
provide, based on the third bandwidth range, the first modified file to the user device.

11. The apparatus of claim 9, wherein the first modified file has a first image quality, and wherein the second modified file has a second image quality that is different from the first image quality.

12. The apparatus of claim 9, wherein the instructions, when executed by the one or more processors, cause the apparatus to provide one of the first modified file or the second modified file to the user device by performing at least one of:
based on the bandwidth available to the user device satisfying a threshold, providing the first modified file to the user device; or
based on the bandwidth available to the user device not satisfying the threshold, providing the second modified file to the user device.

13. The apparatus of claim 12, wherein a transfer time associated with providing the first modified file is within a threshold time difference from a transfer time associated with providing the second modified file.

14. The apparatus of claim 9, wherein the instructions, when executed by the one or more processors, further cause the apparatus to:
generate a mapping of a plurality of file classes to a plurality of bandwidth ranges, wherein the plurality of bandwidth ranges comprise the first bandwidth range and the second bandwidth range.

15. The apparatus of claim 9, wherein the instructions, when executed by the one or more processors, cause the apparatus to provide one of the first modified file or the second modified file further based on a display capability of the user device.

16. The apparatus of claim 9, wherein the first modified file and the second modified file have at least one of a different encoding format, a different resolution, a different bitrate, or a different image quality.

17. A method comprising:
converting, by a computing device, a file comprising content into a modified file that includes the content of the file and has a first level of compression, wherein the modified file is associated with a first bandwidth range, the first bandwidth range comprising a first minimum bandwidth of the modified file and a first maximum bandwidth of the modified file;
based on determining a change in a measured data transfer speed of a user device, and further based on the first minimum bandwidth and the first maximum bandwidth, associating the modified file with a second bandwidth range, the second bandwidth range comprising a second minimum bandwidth of the modified file and a second maximum bandwidth of the modified file; and
providing, by the computing device and based on the second bandwidth range, the modified file for download by the user device.

18. The method of claim 17, wherein the modified file is a first modified file having a first file size, and
wherein the method further comprises:
converting, by the computing device, the file into a second modified file that includes the content of the file, wherein the second modified file has a second file size different from the first file size and is associated with a third bandwidth range different from the first bandwidth range; and
providing, by the computing device and based on a bandwidth available to the user device, one of the first modified file or the second modified file to the user device.

19. The method of claim 17, wherein the associating the modified file with the second bandwidth range comprises, based on determining that the measured data transfer speed of the user device has decreased, associating the modified file with the second bandwidth range that has one of a lower maximum bandwidth or a lower minimum bandwidth.

20. The method of claim 17, wherein the associating the modified file with the second bandwidth range comprises, based on determining that the measured data transfer speed of the user device has increased, associating the modified file with the second bandwidth range that has one of a higher maximum bandwidth or a higher minimum bandwidth.

* * * * *